United States Patent

Yungbluth

[15] 3,701,876
[45] Oct. 31, 1972

[54] PROPORTIONING GIRTH REDUCTION IN HIGH FREQUENCY WELDING OF COPPER OR COPPER BASE ALLOY TUBING

[72] Inventor: Russell L. Yungbluth, Florrisant, Mo.

[73] Assignee: Olin Corporation

[22] Filed: June 21, 1971

[21] Appl. No.: 154,753

[52] U.S. Cl. .................219/67, 29/477, 219/8.5, 219/105
[51] Int. Cl. .............................................B23k 31/06
[58] Field of Search.....219/59, 64, 67, 8.5, 104, 105; 29/477, 477.7

[56] References Cited

UNITED STATES PATENTS

| | | |
|---|---|---|
| 3,015,018 | 12/1961 | Rudd..........................219/67 |
| 3,037,105 | 5/1962 | Kohler........................219/8.5 |
| 3,619,547 | 11/1971 | Cavagnero...................219/67 |

Primary Examiner—J. V. Truhe
Assistant Examiner—L. A. Schutzman
Attorney—Robert H. Bachman et al.

[57] ABSTRACT

In welding metal strip into tubing, the strip is formed into an open tube whose edges define a longitudinally extending gap and are brought together at a weld point. The girth of the tube at the weld point is reduced to substantially squeeze out the molten metal and form a force weld. The degree of girth reduction is proportioned to the ratio of tube wall thickness to tube outside diameter such that the girth reduction falls within the region delineated by the area ABCD, and preferably by the area CDEF in FIG. 3, for ratios up to 0.08. For ratios in excess of 0.08, the girth reduction is at least 0.080 inch and, preferably, from 0.080 to 0.090 inch.

2 Claims, 3 Drawing Figures

PATENTED OCT 31 1972 3,701,876

INVENTOR:
RUSSELL L. YUNGBLUTH
BY Paul Wermuth
ATTORNEY

PROPORTIONING GIRTH REDUCTION IN HIGH FREQUENCY WELDING OF COPPER OR COPPER BASE ALLOY TUBING

BACKGROUND OF THE INVENTION

In the art of welding metal strip into tubing, it is known to use high frequency induction welding. A typical example of a prior art apparatus and process is set out in U.S. Pat. No. 3,037,105, granted May 29, 1962. The welding process disclosed therein employs a forge welding technique wherein there is a reduction in the girth of the tube at the weld rolls.

In accordance with the known practices, the reduction was limited to an amount necessary to substantially squeeze out the molten metal from between the tube edges which are being welded together. This squeezing out or girth reduction also resulted in a slight upset of the tube edges, which with the squeezed out molten metal forms a bead on the inner and outer surfaces of the tube along the weld seam. These beads are then removed by known scarfing techniques.

SUMMARY OF THE INVENTION

In accordance with this invention, it has been found for copper and copper base alloys that the amount of squeeze out or girth reduction has a significant effect on weld quality. Further, it has been found that the amount of squeeze out must be limited within specific ranges for given tube wall thicknesses to tube outside diameter ratios.

Therefore, this invention comprises proportioning the squeeze out at the weld rolls to the thickness to diameter ratio such that the degree of squeeze out employed falls within the area ABCD of FIG. 3 and, preferably, within the area CDEF of FIG. 3.

It is accordingly an object of this invention to provide a process for welding copper or copper base alloy strip into tubing wherein the girth reduction at the weld rolls is proportioned to the ratio of tube wall thickness to tube outside diameter of the tube being welded.

It is a further object of this invention to provide a process as above wherein the degree of girth reduction at the weld rolls versus the thickness to diameter ratio falls within the range ABCD of FIG. 3 and, preferably, within the range CDEF.

Other objects and advantages will become apparent from the following description and drawings.

DESCRIPTION OF THE PREFERRED EMBODIMENTS

Figures 1, 2:
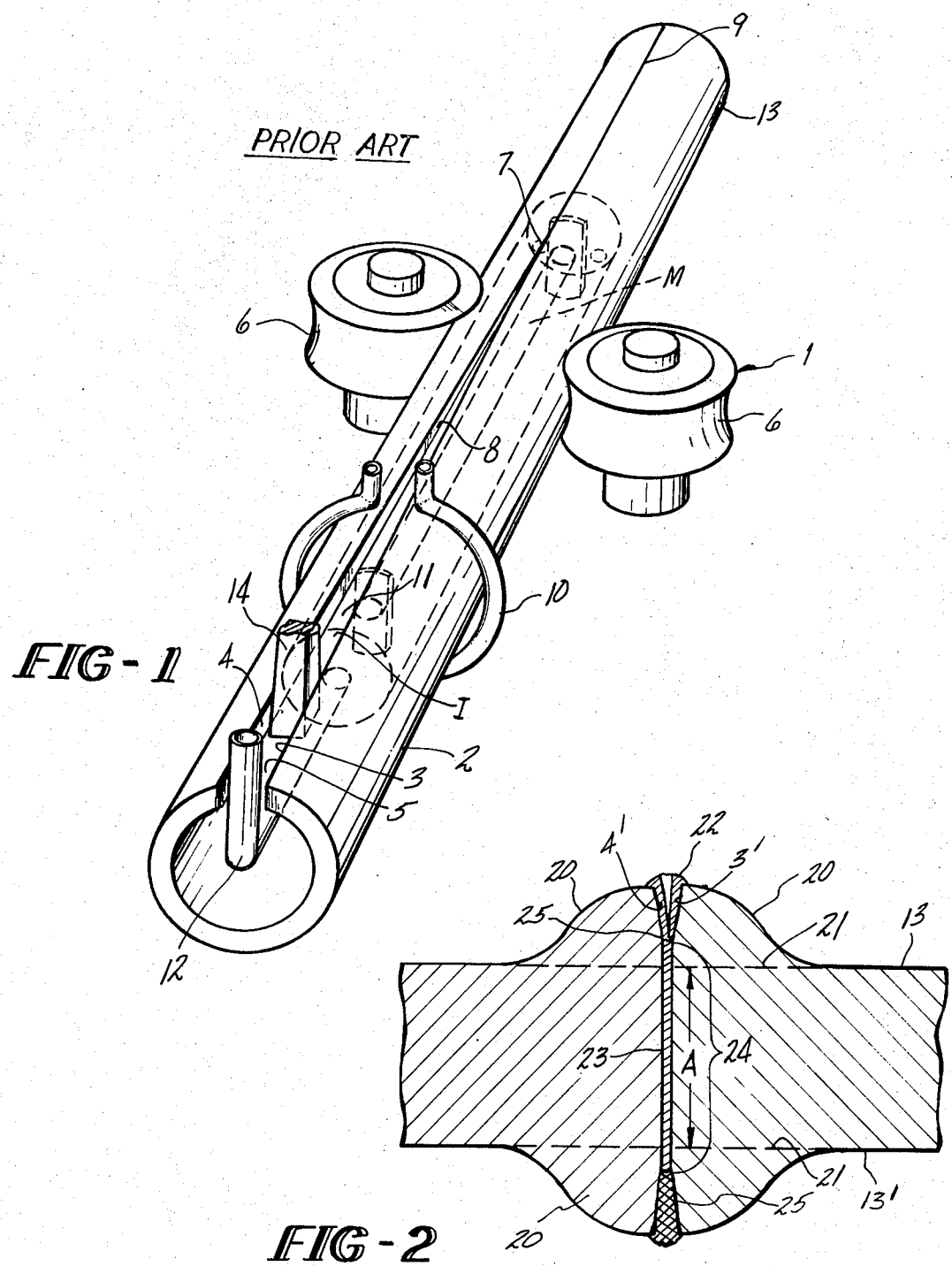
FIG. 1 is a schematic view of a typical prior art high frequency welding apparatus with which the process of this invention may be carried out.
FIG. 2 is a cross section of a typical weld obtained in accordance with the instant invention.

Referring now to the drawings and especially to FIG. 1, there is illustrated a typical welding apparatus 1 for welding metal strip in the form of a preformed open tube 2 into tubing. The apparatus is a adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known design. The forming mill may contain a plurality of roll stands or dies which form metal strip into the open tube 2. It is to be understood that other roll stands may be situated in line immediately following the apparatus 1 to further shape or size the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rollers of known form which engage opposite sides of the tube 2 and cause the longitudinally extending gap 5 therein to become closed substantially at a weld point 7 forming a V-shaped gap 8. As the open tubing 2 advances to the weld point 7, the edges 3 and 4 at the gap 8 become welded together along the weld seam 9.

The edges 3 and 4 at the V-shaped gap 8 are heated by means of an induction coil 10 or contacts. The induction coil 10 shown is a single turn coil; however, a multiturn coil or other appropriate device could be substituted for the single turn coil.

The coil 10 is formed of wrought metal tubing. The coil is electrically connected to a source of high frequency current, not shown. The high frequency current is normally at least 10 kilocycles per second and, preferably, at least 100 kilocycles per second or higher. The coil is also connected to a source of cooling medium (not shown) which flows through the tubing to keep it from overheating.

The apparatus 1 may also include the following elements as shown in FIG. 1. An impeder I may be included to improve the efficiency of the induction coil 10 by increasing the impedance of the high frequency current paths around the back of the open tube 2. This reduces the flow of current around the back of the tube 2 and increases the flow of current along the tube edges 3 and 4 running from a point on the tube edge 3 adjacent the coil 10 to the weld point 7 and back the opposing tube edge 4 to a point adjacent the coil 10. This results in more efficient heating of the edges 3 and 4 of the open tube 2, the edges being heated up to the welding temperature upon reaching the weld point 7.

The impeder I may be of any suitably known construction and comprises a schroud 11 connected to a hollow supporting arm 12 as shown extending down through the gap 8. The actual shape of the schroud 11 shown in FIG. 1 is merely schematic and it may have any suitable shape.

A source of cooling medium (not shown) such as water is connected to the hollow supporting arm 12 for flowing water into the schroud 11 and about a core of magnetic material M which is held therein. The magnetic material in the core should be of an insulating nature to provide a core substantially free of eddy current losses. The core is preferably a sintered magnetic oxide insulating material, preferably of types now well known which have a low loss factor and high volume resistivity. A suitable material is marketed under the name "Ferramic" by General Ceramic and Steatite Corporation, the permeability thereof being substantially greater than unity. The cooling medium which passes through the hollow supporting arm 12 flows within the schroud 11 and about the Ferramic core M to cool the core and is generally discharged within the welded tube 13.

Further, since the angle of the V-shaped gap 8 is important, a seam guide means 14 is generally included at a point in advance of the induction coil 10 to accurately space apart the edges of the tube 2 and, thereby, obtain the desired angle. The seam guide means may be formed of a suitable insulating material protruding down into the gap so that the roll stand preceding that position (not shown) will cause the tube gap edges 3 and 4 to be pressed against the opposite sides of the seam guide 14 whereby the edges are maintained with a uniform separation.

The welding apparatus just described is but one type of apparatus useful with the instant invention and numerous other high frequency welding apparatus are known which could be employed in place thereof.

It has heretofore been thought that large amounts of squeeze out or girth reduction at the weld rolls 6 were not required to obtain sound welds. While this may be the case when welding metals having relatively high resistivities with respect to copper and having comparatively large temperature differentials between their solidus and liquidus points as compared to copper base alloys, it has been found in accordance with this invention that following prior art practices results in a number of difficulties when welding copper and copper base alloys.

When the degree of squeeze out is slight, say on the order of 0.030 inch, the amount of upset of the tube edges 3 and 4 at the weld rolls 6 is very small. Therefore, virtually the whole thickness of the tube edge as upset is heated up to welding temperature to obtain a weld over the full thickness of the tube wall. This results in a pool of molten metal at the weld point 7 which has the effect of moving the position of the weld point closer to the coil 10, thereby increasing the heat input to the tube edges 3 and 4 at the weld point 7 and other associated effects.

The changes in the heat input to the tube edges 3 and 4 require consequent changes in the power applied to the induction coil 10, thereby resulting in an inherent instability in the welding process and in nonuniform welds. The instability in the welding process can also result in surface portions of the weld seam 9 having a cast structure rather than a forged welded structure. Such a cast structure is undesirable and is susceptable to cracks, voids and poor mechanical properties. Further, the molten metal pool may under the influence of the magnetic field be at least partially blown out of the weld area resulting in a void which generally extends well into the tube wall.

To substantially eliminate the problem of voids and other defects encountered with the prior art process and to develop a more stable process which will yield uniform welds of high quality, in accordance with this invention the amount of girth reduction at the weld rolls 6 has been substantially increased. The result of increasing the girth reduction is shown schematically in FIG. 2. The weld structure shown therein is meant to be illustrative but not limitive of the instant invention and is not to scale.

As shown therein, the amount of upset 20 of the tube edges 3 and 4 is substantial and considerably larger than would be obtained by the prior art process. It is therefore possible in accordance with this invention to control the power input to the coil 10 such that the whole thickness of the tube wall edges 3' and 4' as upset are not heated to welding temperatures. The thickness between the dashed lines 21 in FIG. 2 is the true wall thickness A which will be obtained after the upset portions 20 and weld beads 22 have been scarfed from the inside and outside tube surface 13 and 13'.

In the induction heating process of this invention, the heat is most concentrated toward the middle 23 of the tube wall edges 3' and 4'. Therefore, it is possible to adjust the power input to the coil 10 such that only a portion 24 slightly in excess of the true tube wall thickness A is heated to welding temperatures and thereby subjected to forge welding. The remaining portions 25 of the upset tube wall edges 3' and 4' are either unwelded or contain squeezed out molten metal from the forge welding zone 24 which at best forms a cast type weld.

Cracks or voids in the cast portions 25 of the weld appear in the upset portion 20 of the strip edges 3' and 4' which is scarfed away, thereby leaving a uniform void free weld in the tube after scarfing. Further, since the region of forge welding 24 is slightly greater than the true thickness A of the tube wall, slight instabilities in the heat supplied to the tube edges will not reduce the region of the forge welding sufficiently to have any substantial amount of cast material present in the tube wall after scarfing, thereby eliminating difficulties attendant to the presence of a cast weld portion 25 near the surface of the weld seam.

In view of the fact that the whole upset tube edge surface 20 is not heated to welding temperatures, no pool of molten metal forms at the weld point 7 as with the prior art process, save for the metal which is squeezed out from the forge welding zone 24. Even if this squeezed out metal is blown out under the influence of a magnetic field, the resulting void would occur in the upset portion 20 of the tube wall and would, therefore, be scarfed off leaving a defect free weld.

The problem of instability of the welding process is further overcome because the absence of the floating molten metal pool as in the prior art process allows the weld point 7 to be maintained at a position substantially constant with respect to the induction coil 10.

A further advantage in accordance with the instant invention is the fact that the greater degree of upset provides a continuous strip of scarfing material which is easily disposed of both within and without the tube. The scarf is not susceptable to build up. In accordance with the prior art process, there may be insufficient upset area and weld metal bead to form a continuous strip of scarfing and instead individual particles are removed. These individual particles tend to build up and interfere with the welding process sometimes even requiring shutdown of the mill to clean out the resultant clogs.

To obtain the welds as shown in FIG. 2 in accordance with this invention it is essential that the squeeze out or girth reduction at the weld rolls be proportioned to the tube wall thickness to tube outside diameter ratio such that the girth reduction is maintained within the area ABCD of FIG. 4 and, preferably, within the area CDEF.

Figure 3:
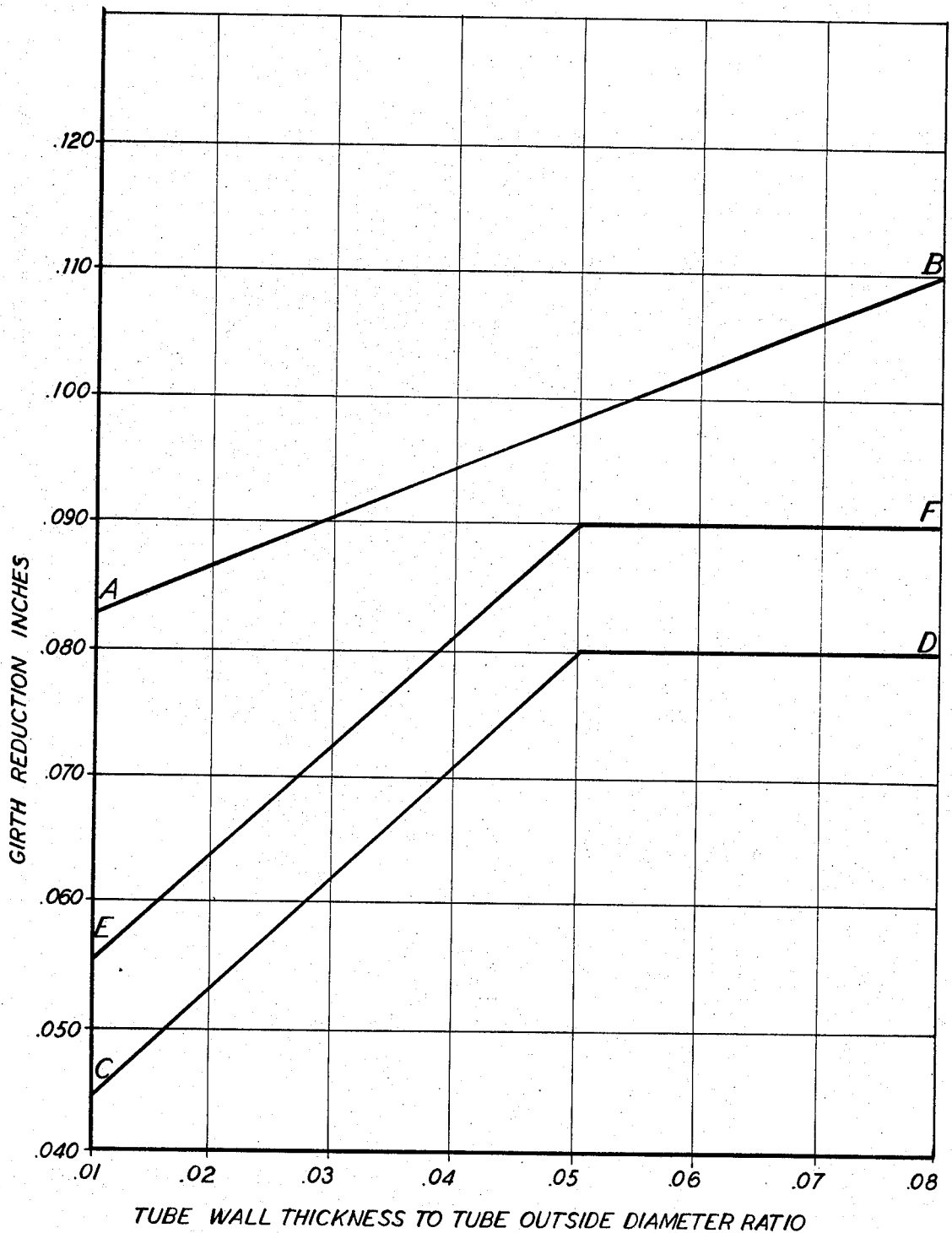
FIG. 3 is a graph delineating the permissable ranges of girth reduction for given ratios of tube wall thickness to tube outside diameter.

The areas delineated in FIG. 3 are based on practical operating ranges of 0.015 to 0.095 tube wall thickness and ½ to 3⅛ inches inclusive outside diameters. It should be observed that the preferred operating ranges flatten out between 0.080 inch and 0.090 inch squeeze out and this range of girth reduction is applicable to tube wall thickness to tube outside diameter ratios in excess of 0.08.

Therefore, in accordance with this invention when welding copper or copper base alloy tubing having a tube wall thickness to tube outside diameter ratio of 0.01 to 0.08, the ranges of girth reduction should be maintained within the levels set out in FIG. 3. For ratios in excess of 0.08, the range of girth reduction should be limited to at least 0.080 inch and, preferably, 0.080 to 0.090 inch.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. A process of welding metal strip into tubing comprising the steps of:
    forming said strip into an open tube whose edges define a longitudinally extending gap;
    bringing said edges together at a weld point; and
    reducing the girth of said tube at said weld point to substantially squeeze out any molten metal from between said strip edges and, thereby, form a forge weld;
    the improvement wherein: said metal is copper or a copper base alloy; and wherein in said step of reducing the girth of said tube, the girth reduction is proportioned to the ratio of tube wall thickness to tube outside diameter such that the girth reduction falls within the range delineated by the area ABCD in FIG. 3, for said ratios up to 0.08 and is at least about 0.080 inch for said ratios in excess of 0.08.

2. A process as in claim 1 wherein said girth reduction is maintained within the area CDEF for said ratios up to 0.08 and is maintained between about 0.080 inch and 0.090 inch for said ratios in excess of 0.08.

* * * * *